United States Patent Office 3,388,082
Patented June 11, 1968

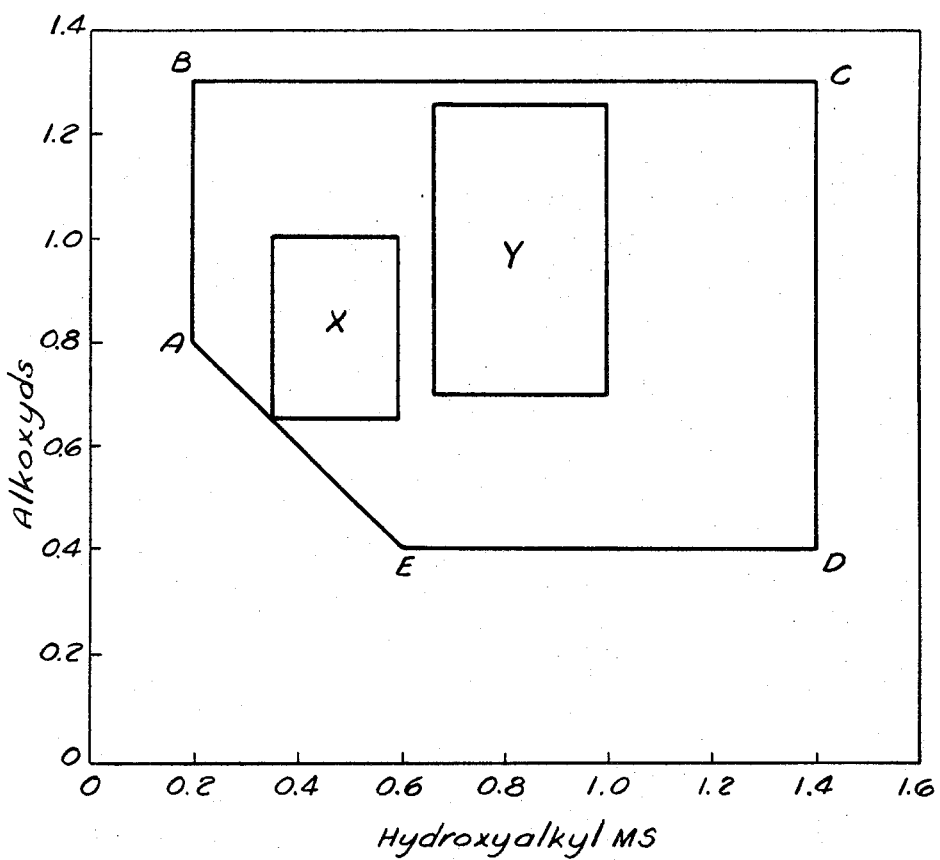

3,388,082
NOVEL HYDROXYPROPYL METHYL CELLULOSE ETHERS, A PROCESS FOR PREPARING THE SAME, AND COMPOSITIONS UTILIZING SUCH ETHERS
Samuel M. Rodgers, Jr., Burton F. Wakeman, and Albert B. Savage, Midland, Mich., assignors to The Dow Chemical Company, Midland, Mich., a corporation of Delaware
Filed Nov. 1, 1965, Ser. No. 505,838
6 Claims. (Cl. 260—17)

This invention relates to novel water-soluble hydroxypropyl methyl cellulose ethers having a community of properties that make them unusually well adapted for use in aqueous coating compositions. The invention also comprehends the process by which the ethers are prepared.

Water-soluble cellulose ethers have long been employed in aqueous coating compositions as thickeners and protective colloids. Such cellulose ethers have an enzyme resistant structure providing viscosity stability to the coating composition. In addition, the ethers have provided generally superior application and film properties over the natural products that had been employed in that function. However, the cellulose ethers have not always permitted good color development. By color development is meant the capacity of a coating composition to resist agglomeration or flocculation of the pigment so as to realize the full development of the color of a given pigment at a given concentration.

The provision of a new class of water-soluble cellulose ethers is the principal object of this invention.

Another object is to provide a process for preparing such cellulose ethers.

Still another object is to provide coating compositions employing the novel cellulose ethers of this invention.

The above and related objects are achieved with a class of water-soluble hydroxypropyl methyl cellulose ethers characterized in having a methoxyl degree of substitution of from 0.4 to 1.3 and a hydroxypropyl molar substitution of from 0.2 to 1.4, and a total substitution of at least 1.0 combined degree of methoxyl substitution and hydroxypropyl molar substitution.

The objects are further realized by the process for preparing such cellulose ethers, said process comprising (1) preparing an alkali cellulose by contacting cellulose with an amount of caustic that is less than stoichiometrically equivalent to the cellulosic hydroxyls, (2) cooling and aging said alkali cellulose, (3) removing the air from the reactor containing said alkali cellulose, (4) loading the methyl chloride, propylene oxide and an organic process control agent, the methyl chloride and propylene oxide being in certain amounts, (5) conducting the reaction under strictly controlled temperature conditions, (6) separating the solids from the liquids and the vapors, (7) neutralizing excess caustic, (8) washing the product in the presence of auto-originated brine, and (9) drying. The objects are still further realized with aqueous coating compositions containing the novel cellulose ethers of this invention.

The cellulose ethers falling within the comprehension of this invention are those within the line ABCDE of the appended drawing. As therein shown, these are the cellulose ethers of a particular range of methoxyl degree of substitution and degree of hydroxypropyl molar substitution with a combined substitution of at least 1.0. The products falling within the areas X and Y are especially preferred products for aqueous coating compositions, those of X being preferable when the cellulose ethers are of intermediate viscosity, and those in Y when the cellulose ethers are of high viscosity.

The cellulose ethers are made by first preparing an alkali cellulose followed by etherification and finishing steps. The preparation of the alkali cellulose may be done by a known process using a limited amount of caustic. Such a process, for example, is shown in U.S. 2,949,452, issued Aug. 16, 1960. In that patent, it is disclosed that in the preparation of alkali cellulose, it is preferred to employ ratios of basic material to cellulose of from about 1.2 to 2.8 moles to 1 mole. When sodium hydroxide is used, this ratio will be from 0.3 to 0.7 part by weight of sodium hydroxide to each part of cellulose. To achieve such a ratio with the common dipping procedures for preparing alkali celluloses, it has been found that an alkali hydroxide concentration of from 30 to 55 percent by weight should be used. The alkali cellulose is prepared by contacting the cellulose with the strong base until the alkali cellulose has the above defined molar ratio of base to cellulose. In prior methods of preparing alkali celluloses, it was considered necessary to employ the caustic or other base either in excess or at an elevated temperature to achieve substantially uniform penetration and swelling of base throughout the cellulose and, consequently, to provide satisfactory solubility of the subsequently etherified product. However, that alkali cellulose, after subsequent etherification, resulted in a product having the previously discussed disadvantages, such as poor aqueous solubility and a relatively low gelation temperature. When substantially less than 1.2 moles of base are used for each mole of cellulose, the products, after subsequent etherification, have a great amount of insoluble material causing hazy solutions and non-homogeneous articles unless such solids are removed by centrifuging. In has now been found that when the cellulose is contacted by dipping, soaking, or other means with the base in the concentrations and weight ratios mentioned above and at about room temperature, the cellulose is substantially uniformly penetrated and slightly swollen and an alkali cellulose having a molar ratio of from 1.2 to 2.8 moles base per mole of cellulose results. Slurry process procedures in organic suspending agents may also be used.

The alkali cellulose is loaded into a suitable pressure vessel, such as an autoclave, the air evacuated and purged with nitrogen. The etherifying agents are then added. The useful agents are methyl chloride and propylene oxide. The reagents may be added sequentially or simultaneously. It is a requisite of this process that limited amounts of the etherifying reagents are used. The methyl chloride is less than that stoichiometrically equivalent to the sodium hydroxide in the alkali cellulose and the amounts of methyl chloride and of propylene oxide are limited to those required to give the desired molar substitution at the utilization efficiency of the particular composition and reactor. The use of excess etherifying reagents is to be avoided. Roughly one-third to one-half of each reagent reacts with the cellulose, while the rest is consumed in by-product formation.

The process by which the present cellulose ethers are prepared also requires strict control of the exothermic reaction. This means that during the etherification, the temperature should be maintained at about a constant level until at least sufficient etherification has taken place that the reaction is negligibly exothermic. If this is not done, there will be a reagent wastage through side reactions and also in irregular and insufficient substitution which produces cellulose ethers not having the desired physical properties. The temperatures that are useful during the exotherm may be varied from between 35° C. to about 60° C., but no higher than that temperature at which exact process control through heat removal is capable of being achieved, or runaway side reactions may result. The delta T between the reactor temperature and the coolant should not exceed 5 to 8 degrees, as discussed by D. E.

Boynton, Hercules Powder Company, in National Safety Congress Transactions Vol. 5, 1959, pages 17–21, avoiding unstable control. Process control may be facilitated by use of an organic process control agent. That may be an inert organic suspending agent such as, for example, tertiary butanol or it may be an ebullient agent as, for example, dimethyl ether. Any ebullient agent should be non-reactive, a non-solvent and have adequate vapor pressure and heat of condensation to provide heat transfer under the conditions of the reaction. External means for controlling the process may also be employed. This may involve cooling water transferred through jackets or coils controlled by programing the temperature or the reaction, or by programing a moderate rate of pressure rise. When the exotherm is completed, the reaction may be finished at 80 to 100° C. without harm. The overall reaction time may be 7 to 12 hours.

When the etherifying reactions have been completed, the vapors are vented or recovered, the excess caustic is neutralized as, for example, with carbon dioxide and the product is purified by washing. If the products are non-gelling, they would have to be washed with an organic solvent; if thermal gelling, the use of a limited amount of water so that the product remains insoluble in the brine may be used. The salt may be separated while carried in the brine so-formed. After washing, the product may be dried and then optionally may be granulated, milled, surface treated, or otherwise prepared for the end use.

The products of this invention may be prepared in any viscosity grade, although those cellulose ethers having viscosities of from about 400 to 15,000 centipoises, when measured in 2 percent solution at 20° C., are most useful. The products are water-soluble and exhibit many of the properties of other water-soluble cellulose ethers. When included in aqueous coating compositions in an amount of from 0.1 to 5 percent by weight, the ethers function as thickeners and protective colloids. They are particularly valuable when used with the latex paints of polymers made from ethylenically unsaturated monomers, such as styrene, butadiene, vinyl acetate, and the acrylic esters. When so used, the cellulose ethers provide good film and application properties as well as extended shelf life and good color development.

The concept of the present invention will be illustrated by the following examples wherein all parts and percentages are by weight.

Example 1

Fifteen pounds of 1600 sec. cotton linters pulp in roll form were passed continuously through a bath of 50 percent aqueous NaOH solution. Excess NaOH was removed. The alkali cellulose contained 27.5 percent NaOH, corresponding to a NaOH/cellulose weight ratio of 0.64/1. The alkali cellulose, after aging and cooling, was loaded into a suitable autoclave, sealed and evacuated. Then 21 pounds of mixed dimethyl ether/methyl chloride containing 35 percent methyl chloride, and 7.95 pounds of 1,2-propylene oxide were added. The reaction was conducted at 44 to 48° C. until the exotherm was completed, and was then finished below 100° C. The time was 12 hours. The product was neutralized with $CO_2$ gas. The recovered solids were slurried in water in the ratio of 4 parts of water to 1 part of reaction mass, separated, and dried. The finished product contained 2.6 percent NaCl. The methoxyl D.S. was 0.73 and the hydroxypropoxyl M.S. was 0.46. The viscosity of a 2 percent aqueous solution was 535 cps. at 20° C. The gelation temperature was near 100° C. The product was useful for thickening acrylic latex paint.

Example 2

214 pounds of 600 sec. cotton linters were converted to alkali cellulose containing 27.1 percent NaOH, corresponding to a NaOH/cellulose ratio of 0.62/1. After aging, cooling, loading in a suitable autoclave, sealing and evacuating, vent gas containing 43 percent methyl chloride in the ratio of 1.38/1 vent gas/cellulose and 1,2-propylene oxide, 1.0 lb./lb. cellulose, were added. The reaction was controlled at 46° C. until the exotherm was completed, and finished below 100° C. The time was about 12 hours. The product was neutralized with $CO_2$ gas. After separation, it was slurried with a limited amount of water. The dried product contained 3.8 percent NaCl, had a methoxyl D.S. of 0.89, a hydroxypropoxyl M.S. of 0.86, and a 2 percent solution viscosity of 11,700 cps. at 20° C.

Example 3

Ethyl chloride, 0.67 lb./lb. cellulose, was used as ebullient agent in a reaction of the type of Example 1. Excellent temperature control resulted.

Example 4

Alkali cellulose containing NaOH/cellulose 0.70/1 was loaded to a suitable autoclave, sealed, and evacuated. Fifteen pounds of cellulose were loaded. The ebullient agent was diethyl ether. Ethylene oxide, 0.30 lb./lb. cellulose, was metered to the reactor at the rate of 2 pounds per hour. The temperature was kept at 50° C. When the exotherm was completed, the reactor was cooled to 42° C., methyl chloride 0.50 lb./lb. cellulose was added, and the reaction was completed below 100° C. in a total time of 13.5 hours. The solvent washed product, after drying, was useful as a latex paint thickener.

Example 5

Alkali-soluble methyl cellulose, D.S. 0.96, was prepared by the method of U.S. 2,408,326, issued on Sept. 24, 1946. The product was washed and dried. One part of the product was suspended in 15 parts of tert.-butanol. NaOH/cellulose 0.22/1, $H_2O$/cellulose 2.16/1, and 1,2-propylene oxide/cellulose 0.36/1 were added. The mixture was heated for 5 hours at 78° C. in a stirred glass resin reactor. The product, solvent washed, contained 0.55 M.S. hydroxypropoxyl. It was an excellent thickener for latex paint.

Example 6

An acrylic latex paint was prepared containing:

Pigment grind: Lb.
Water _____ 250
Pigment dispersant _____ 9.2
Poly(propylene glycol) P–1200 _____ 2
Titanium dioxide, rutile _____ 185
Titanium dioxide, anatase _____ 45
Mica _____ 30
Calcium carbonate _____ 100
Clay _____ 55

This was ground or sheared to proper dispersion.

The following were then mixed and added to the pigment grind, and remixed:

Cellulose thickener, in aqueous solution—3.5 lb.

The paint let down is then blended:

Acrylic latex (55% solids) _____lb__ 450
Defoamer _____lb__ 5
Preservative _____lb__ 3
Pigment volume concentration ____percent__ 40
Non-volatile content _____do____ 54.9
pH Adjusted to 9.0
Viscosity—Krebs units _____ 85–90

In this composition, the following were compared:

| | Conc. Lb./100 Lb. | Krebs Units | Color Development | Leveling | Days | Separation, Percent |
|---|---|---|---|---|---|---|
| Example 1 | 5.8 | 85 | 4 | 6 | 19 | 1.2 |
| Example 2 | 3.7 | 94 | 4 | 7 | 18 | 2.5 |
| Example 4 | 6.4 | 102 | 4 | 3 | 60 | 0 |
| For comparison: | | | | | | |
| Hydroxyethyl cellulose 250 cps | 5.8 | 92 | 4 | 5 | 22 | 3.5 |
| Hydroxypropyl methyl cellulose (19-24% methoxyl; 4-12% hydroxypropyl) | 5.8 | 88 | 5 | 5 | 22 | 7.5 |

The "color development" test refers to the tendency of the pigment to agglomerate during grinding. The heated paint is applied to a panel, and additional shear, to break up the pigment aggregates, is then applied. The higher the rating, the greater the effect of shear. "4" is satisfactory, "5" is only fair.

The leveling test measures the tendency to leave brush marks. A poor leveling panel looks as if a comb had been drawn across it. A good leveling panel is smooth. In this test, the rating improves from zero to 10. Three is good, five is very good, six to seven approaches excellence.

It is desired that paint should not separate on standing in the warehouse. Ten percent separation is considered excessive.

The table indicates that the products of the present invention are good with respect to color development, have excellent leveling if the viscosity is satisfactory, and good even when it is too high, and that they are excellent with respect to phase separation.

What is claimed is:

1. A water-soluble hydroxypropyl methyl cellulose ether characterized in having a methoxyl degree of substitution of from 0.4 to 1.3 and a hydroxpropyl molar substitution of from 0.2 to 1.4 and a total substitution of at least 1.0 combined degree of methoxyl substitution and degree of hydroxypropyl molar substitution.

2. The water-soluble cellulose ether of claim 1 wherein the methoxyl degree of substitution is 0.70 to 1.24 and hydroxypropyl molar substitution is 0.66 to 1.0.

3. The water-soluble cellulose ether of claim 1 wherein the methoxyl degree of substitution is 0.64 to 1.0 and the hydroxypropyl molar substitution is 0.36 to 0.6

4. A process for preparing water-soluble hydroxypropyl methyl cellulose ethers comprising (1) preparing an alkali cellulose by contacting cellulose with an amount of caustic less than stoichiometrically equivalent to the cellulosic hydroxyls, (2) cooling and aging said alkali cellulose, (3) removing the air from the reactor containing said alkali cellulose, (4) loading methyl chloride, propylene oxide, and an organic process control agent, the methyl chloride being in an amount stoichiometrically less than equivalent to the alkali in said alkali cellulose and the amount of propylene oxide limited to that required to give the desired molar substitution, (5) conducting the reaction under strictly controlled temperature conditions of between 35° C. to 65° C. with the delta T not exceeding 8° C. during the exotherm, (6) separating the solids from the liquids and the vapors, (7) neutralizing excess caustic, (8) washing the product in the presence of auto-originated brine and (9) drying.

5. An aqueous coating composition comprising the emulsion polymerizate of an ethylenically unsaturated monomer, a pigment and from 0.1 to 5.0 percent of water-soluble hydroxypropyl methyl cellulose ether characterized in having a methoxyl degree of substitution of from 0.4 to 1.3 and a hydroxypropyl molar substitution of from 0.2 to 1.4 and a total substitution of at least 1.0 combined degree of methoxyl substitution and degree of hydroxypropyl molar substitution.

6. The composition of claim 5 wherein said ethylenically unsaturated monomer is composed of at least one acrylate ester.

References Cited
UNITED STATES PATENTS 2,965,508   12/1960   Windover et al. _____ 106—197
2,985,607   11/1960   Windover et al. _____ 106—197

WILLIAM H. SHORT, *Primary Examiner.*

J. NORRIS, *Assistant Examiner.*